United States Patent
An et al.

(10) Patent No.: US 12,375,021 B2
(45) Date of Patent: Jul. 29, 2025

(54) MOTOR DRIVING CONTROL SYSTEM AND CONTROL METHOD THEREOF

(71) Applicant: Hanon Systems, Daejeon (KR)

(72) Inventors: Kyung Won An, Daejeon (KR); Min Sik Kim, Daejeon (KR); Sang Hun Kim, Daejeon (KR); Won Seok Kim, Daejeon (KR); Tae Wan Kim, Daejeon (KR); Pureunsam Park, Daejeon (KR); Sung Joon Lee, Daejeon (KR); Song Cheol Lee, Daejeon (KR); Ho Bin Im, Daejeon (KR); Eui Hyun Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 51 days.

(21) Appl. No.: 18/282,555

(22) PCT Filed: Mar. 8, 2022

(86) PCT No.: PCT/KR2022/003237
§ 371 (c)(1),
(2) Date: Sep. 18, 2023

(87) PCT Pub. No.: WO2022/215872
PCT Pub. Date: Oct. 13, 2022

(65) Prior Publication Data
US 2024/0171112 A1    May 23, 2024

(30) Foreign Application Priority Data
Apr. 8, 2021  (KR) ........................ 10-2021-0045697

(51) Int. Cl.
*H02P 29/032*  (2016.01)
*H02P 6/08*   (2016.01)
(Continued)

(52) U.S. Cl.
CPC .............. *H02P 29/032* (2016.02); *H02P 6/28* (2016.02); *H02P 29/027* (2013.01)

(58) Field of Classification Search
CPC ........ H02P 29/027; H02P 29/032; H02P 6/28; H02P 6/08
See application file for complete search history.

(56) References Cited

U.S. PATENT DOCUMENTS 5,602,708 A * 2/1997 Felgenhauer ............ G01D 1/16
                                                   361/23
9,114,519 B2* 8/2015 Iwata .................. B25B 23/1475
(Continued)

FOREIGN PATENT DOCUMENTS

JP       H1198681 A  *  4/1999
JP     2006191721 A     7/2006
(Continued)

OTHER PUBLICATIONS

International Search Report issued in PCT/KR2022/003237 on Jun. 21, 2022.

*Primary Examiner* — Thai T Dinh
(74) *Attorney, Agent, or Firm* — NORTON ROSE FULBRIGHT US LLP

(57) ABSTRACT

The present invention relates to a motor driving control system and a control method thereof. The purpose of the present invention is to provide a motor driving control system and a control method thereof, which may change electric current limiting logic, which is applied to a BLDC motor for a cooling fan, in response to an operating speed of the motor to stably protect the motor from an overload in a low-speed driving state as well as an overload in a high-speed driving state.

5 Claims, 3 Drawing Sheets

(51) Int. Cl.
*H02P 6/28* (2016.01)
*H02P 29/024* (2016.01)

(56) References Cited

U.S. PATENT DOCUMENTS

| | | | | |
|---|---|---|---|---|
| 9,547,305 | B2* | 1/2017 | Ushiyama | G05B 19/4062 |
| 10,486,281 | B2* | 11/2019 | Selfors | H02P 29/10 |
| 10,903,775 | B2* | 1/2021 | Hosokawa | H02P 29/02 |
| 11,290,051 | B2* | 3/2022 | Nakamura | H02P 6/15 |

FOREIGN PATENT DOCUMENTS

| | | | |
|---|---|---|---|
| JP | 2011050183 A | | 3/2011 |
| JP | 2019165546 A | | 9/2019 |
| JP | 2020104244 A | * | 7/2020 |
| KR | 20200059849 A | | 5/2020 |

* cited by examiner

MOTOR DRIVING CONTROL SYSTEM AND CONTROL METHOD THEREOF

CROSS REFERENCE TO RELATED APPLICATIONS

This patent application is a national phase under 35 U.S.C. § 371 of International Patent Application No. PCT/KR2022/003237 filed Mar. 8, 2022, which claims the benefit of priority from Korean Patent Application No. 10-2021-0045697 filed Apr. 8, 2021, each of which is hereby incorporated herein by reference in its entirety for all purposes.

TECHNICAL FIELD

The present invention relates to a motor driving control system and a control method thereof, and more particularly, to a motor driving control system and a control method thereof, which may control a motor to stably operate the motor even under a low-speed overload condition.

BACKGROUND ART

Typically, electric current limiting logic is applied to a BLDC motor for a cooling fan to prevent burnout of a motor and an inverter caused by an overcurrent.

Specifically, because of the characteristics of the cooling fan, required electric current consumption increases as an operating speed of the motor increases. Therefore, the electric current limiting logic is set in consideration of a capacity of the motor and allowable electric currents in coils, wires, and other elements according to specifications of the existing elements that constitute the motor.

As illustrated in FIG. 3, during a normal operation, a load is applied to the motor within an electric current limit range, such that the motor operates without applying the applied electric current limiting logic. However, in the event of sluggishness, i.e., a condition in which the motor rotates at low speed and high load without being completely constrained because of foreign substances stuck between rotary bodies, the motor continuously operates by receiving an electric current corresponding to a driving signal, and the electric current consumption increases.

In this case, as illustrated in FIG. 3A, in the case of driving limiting power information, i.e., in case that the current power increases to an electric current limit value corresponding to the electric current limiting logic, the electric current cannot increase any further, and the operating speed decreases. When the operating speed decreases, the operational efficiency deteriorates even when the same electric current is used. Further, heat is excessively generated, an internal temperature increases because of a lack of cooling performance, which eventually causes burnout.

Therefore, the present invention has been made in an effort to solve a problem caused by an overload occurring in a low-speed driving state under a sluggish condition instead of a 'high-speed driving state' corresponding to a typical overload. The present invention has also been made in an effort to stably protect the motor from an overload in a low-speed driving state as well as an overload in a high-speed driving state by changing the applied electric current limiting logic in response to the operating speed of the motor.

In this regard, Korean Patent Application Laid-Open No. 10-2020-0059849 ('BLDC MOTOR OVERLOAD DETECTION DEVICE AND METHOD') discloses a device that measures a difference between a mechanical degree and an electrical degree of a BLDC motor and determines whether the BLDC motor is constrained.

DOCUMENT OF RELATED ART

Patent Document

Korean Patent Application Laid-Open No. 10-2020-0059849 (published on May 29, 2020)

DISCLOSURE

Technical Problem

Accordingly, the present invention has been made in an effort to solve the above-mentioned problem in the related art, and an object of the present invention is to provide a motor driving control system and a control method thereof, which are capable of stably protecting a motor from an overload in a low-speed driving state as well as an overload in a high-speed driving state by changing applied electric current limiting logic in response to an operating speed of the motor in order to solve a problem caused by the overload in the low-speed driving state under a sluggish condition instead of a 'high-speed driving state' corresponding to a typical overload.

Technical Solution

To achieve the above-mentioned object, the present invention provides a motor driving control system including: a motor driving unit 100 configured to provide a drive electric current to a motor 10 in response to an inputted driving signal; a state calculation unit 200 configured to calculate operating state-related information of the motor 10 operated under the control of the motor driving unit 100; an analysis unit 300 configured to analyze allowable power information of the motor 10 by using the operating state-related information of the motor 10 calculated by the state calculation unit 200 on the basis of preset driving limiting power information; and a power control unit 400 configured to generate a control signal for controlling a supply electric current of the motor 10 by using the allowable power information of the motor 10 analyzed by the analysis unit 300 and transmit the control signal to the motor driving unit 100.

Further, the state calculation unit 200 may calculate the operating state-related information including the current rotational speed, the current measured electric current, and the current measured voltage of the currently operating motor 10 under the control of the motor driving unit 100.

Further, the analysis unit 300 may analyze a heat generating state according to a rotational speed and power of the motor 10 on the basis of basic specifications of elements that constitute the motor 10, and the analysis unit 300 may set the driving limiting power information on the basis of the rotational speed and the power.

Further, the analysis unit 300 may compare and analyze the current power and limit power according to the driving limiting power information on the basis of the current rotational speed of the motor 10 calculated by the state calculation unit 200, and the analysis unit 300 may analyze the allowable power information in accordance with the limit power when the current power exceeds the limit power.

Further, the power control unit 400 may change the current power of the motor 10 by controlling the supply electric current of the motor 10 by using the allowable power information made by adopting the current rotational speed of the motor 10 analyzed by the analysis unit 300.

To achieve the above-mentioned object, the present invention provides a motor driving control method including: a driving step S100 of providing, by a motor driving unit, a drive electric current to a motor in response to an inputted driving signal; a current power calculation step S200 of calculating, by a state calculation unit, current power information by acquiring operating state-related information of the motor operated in the driving step S100; a determination step S300 of comparing and determining, by an analysis unit, preset driving limiting power information and the current power information of the motor calculated in the current power calculation step S200; an analysis step S400 of analyzing allowable power information of the motor in accordance with the driving limiting power information when the comparison and determination result in the determination step S300 indicates that the current power information of the motor exceeds the driving limiting power information; and a driving control step S500 of generating, by a power control unit, a control signal for controlling a supply electric current of the motor by using the allowable power information of the motor analyzed in the analysis step S400.

Further, in the current power calculation step S200, the operating state-related information of the motor may include the current rotational speed, the current measured electric current, and the current measured voltage of the motor 10.

Further, the determination step S300 may include comparing and determining the driving limiting power information and the current power information of the motor on the basis of the current rotational speed of the motor 10.

Further, the determination step S300 may include setting in advance the driving limiting power information on the basis of a rotational speed and power of the motor by analyzing a heat generating state according to the rotational speed and power of the motor on the basis of basic specifications of elements that constitute the motor.

Advantageous Effects

According to the motor driving control system and the control method thereof according to the present invention, it is possible to change the electric current limiting logic, which is applied to the BLDC motor for a cooling fan, in response to the operating speed of the motor to stably protect the motor from the overload in the low-speed driving state as well as the overload in the high-speed driving state.

Therefore, it is possible to prevent the occurrence of burnout of the motor and the inverter caused by the occurrence of the low-speed overload by the sluggish condition.

However, the motor may operate at a speed lower than the target speed according to the inputted driving signal because the power control through the supply electric current control. Therefore, the motor driving system provides the external manager or the high-level control means with the alarm indicating that the overload condition of the current motor may occur and the motor may operate at the target speed lower than the inputted driving signal, thereby preventing the burnout of the motor, the inverter, and the like and detecting the breakdown/abnormality.

MODE FOR INVENTION

Hereinafter, a motor driving control system and a control method thereof according to the present invention configured as described above will be described in detail with reference to the accompanying drawings.

Further, the system refers to a set of components, which includes devices, apparatuses, and means that are organized and regularly interact to perform a required function.

A motor applied to the motor driving control system and the control method thereof according to the embodiment of the present invention is a BLDC motor for a cooling fan. Typically, electric current limiting logic is applied to the motor to prevent burnout of the motor and an inverter caused by an overcurrent.

However, in case that a sluggish condition occurs while the motor operates, a rotational speed of the motor is low even in an overload state. For this reason, the electric current is continuously applied, which eventually causes a lack of cooling caused by a low-speed overload and causes the burnout caused by an increase in internal temperature of the motor. That is, the applied electric current limiting logic may sufficiently cope with the 'high-speed overload' but cannot cope with the 'low-speed overload' caused by the sluggish condition or the like.

Therefore, the technical purpose of the motor driving control system and the control method thereof according to the embodiment of the present invention is to stably protect the motor from the overload in the low-speed driving state as well as the overload in the high-speed driving state by changing the applied electric current limiting logic in response to the operating speed of the motor.

Figure 1:
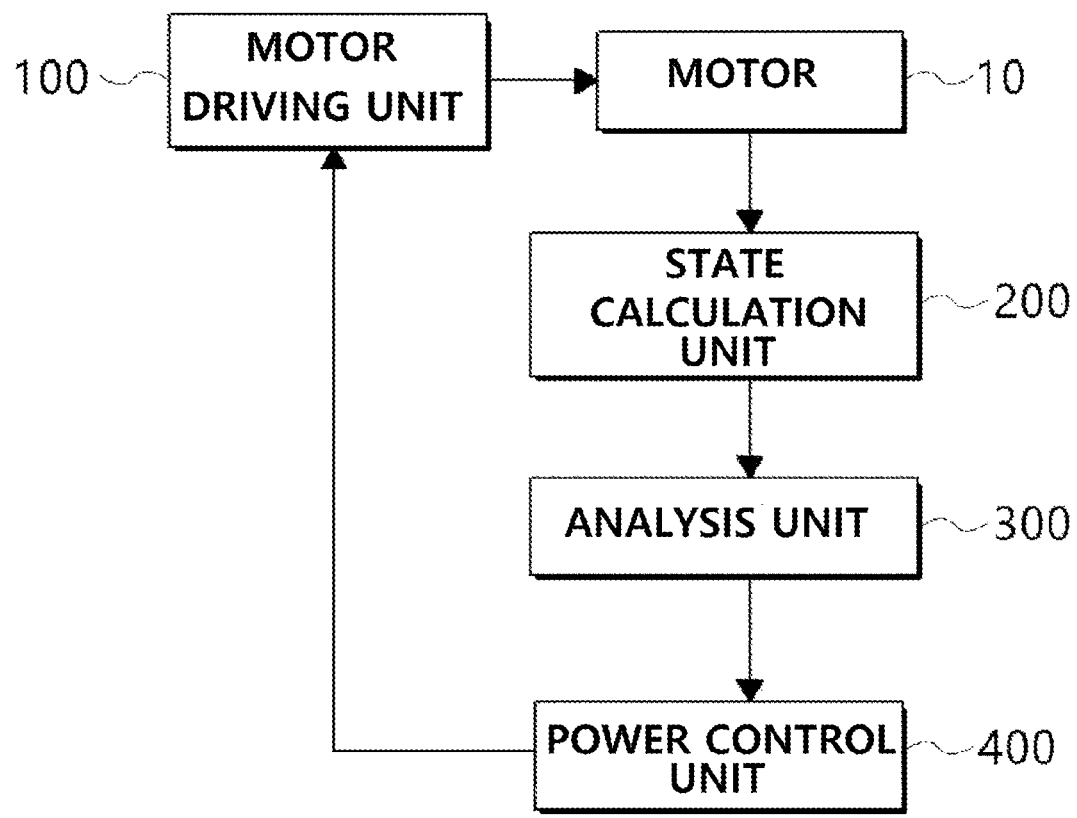
FIG. 1 is an exemplified view illustrating a configuration of a motor driving control system according to an embodiment of the present invention.

FIG. 1 is an exemplified view illustrating a configuration of a motor driving control system according to the embodiment of the present invention. The motor driving control system according to the embodiment of the present invention will be described in detail with reference to FIG. 1.

As illustrated in FIG. 1, the motor driving control system according to the embodiment of the present invention may include a motor driving unit 100, a state calculation unit 200, an analysis unit 300, and a power control unit 400. The components may operate by being included in a single computation treatment means or respectively included in computation treatment means.

The respective components will be described in detail. The motor driving unit 100 may provide a drive electric current to a motor 10 in response to a driving signal inputted from an external manager or a high-level control means.

Specifically, the driving signal includes a target rotational speed at which the motor 10 is intended to operate.

Therefore, the motor driving unit 100 applies an electric current through a speed control means to allow the motor 10 to reach the target rotational speed included in the driving signal.

The state calculation unit 200 may calculate operating state-related information of the operating motor 10 under the control of the motor driving unit 100.

Specifically, the state calculation unit 200 may acquire pieces of information including the current rotational speed, the current measured electric current, and the current measured voltage of the currently operating motor 10 on the basis of the operating state-related information under the control of the motor driving unit 100.

In addition, the state calculation unit 200 may calculate the current power of the motor 10 by using the acquired current measured electric current and the acquired current measured voltage of the motor 10 and store and manage the current power of the motor 10 as the operating state-related information.

On the basis of the preset driving limiting power information, the analysis unit 300 may analyze allowable power information of the motor 10 by using the operating state-related information of the motor 10 calculated by the state calculation unit 200.

In this case, the preset driving limiting power information means a driving limiting power value according to the 'electric current limiting logic' applied to the motor. As illustrated in FIG. 3B, the driving limiting power information may be set by analyzing a heat generating state according to a rotational speed and power of the motor 10 on the basis of basic specification information of the elements that constitute the motor 10 and by setting the driving limiting power information on the basis of the rotational speed and power.

Figure 3A:
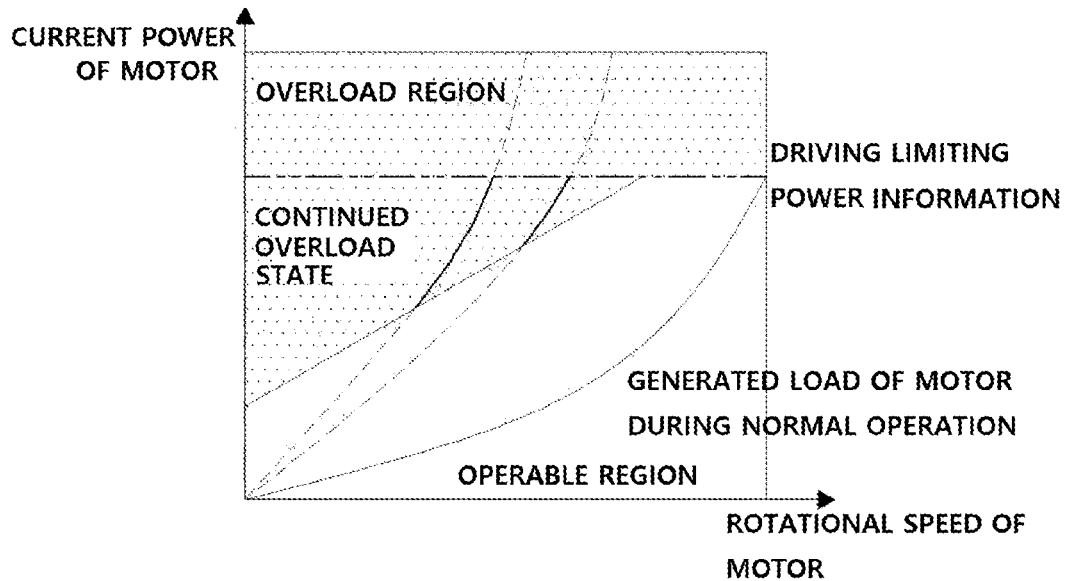
FIG. 3A is a graph illustrating a motor driving control state according to the motor driving control system.
Figure 3B:
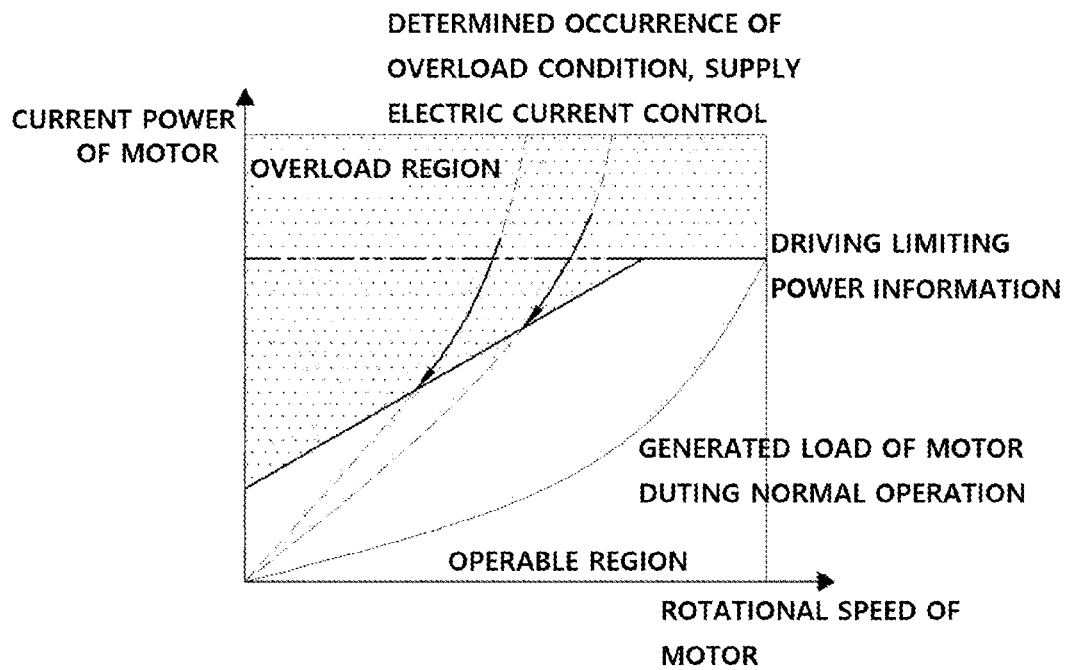
FIG. 3B is a graph illustrating a control method according to the embodiment of the present invention.

As illustrated in FIG. 3A, the driving limiting power value according to the 'electric current limiting logic' in the related art is set so that a power overload of the motor does not occur regardless of the operating speed of the motor. In this case, the speed of the motor is low, as described above. However, only the case in which the driving limiting power information (driving limiting power value) is high speed is considered even when the power state deviates from a normal operation range because of the sluggish condition. For this reason, the state of the motor placed in the low-speed overload condition cannot be accurately recognized, which may eventually cause burnout.

To solve the problem, the analysis unit 300 may set the driving limiting power information by analyzing the heat generating state in accordance with the rotational speed of the motor and the current power.

The analysis unit 300 may compare and analyze the current power and the limit power according to the driving limiting power information on the basis of the current rotational speed of the motor 10 calculated by the state calculation unit 200. In case that the current power exceeds the limit power, the analysis unit 300 may analyze the allowable power information in accordance with the limit power.

In other words, the analysis unit 300 compares and analyzes the limit power according to the driving limiting power information and the calculated current power of the motor 10 on the basis of the current rotational speed of the motor 10 calculated by the state calculation unit 200. In case that the current power of the motor 10 exceeds the limit power, the analysis unit 300 may determine that the motor 10 is in the overload state, and the analysis unit 300 may derive the allowable power information corresponding to the current rotational speed of the motor 10. In this case, the allowable power information is derived on the basis of the driving limiting power information. The allowable power information is not appropriate power, but an upper limit value of the allowable power.

That is, in other words, in comparison with the driving limiting power value in the related art, the driving limiting power information of the analysis unit 300 is set so that the upper limit value of the allowable power varies depending on the rotational speed of the motor. Even when the motor is overloaded even at low speed, the analysis unit efficiently detects the overload so that the safe driving operation may be performed.

The power control unit 400 may generate a control signal for controlling a supply electric current of the motor 10 by using the allowable power information analyzed by the analysis unit 300 and transmit the control signal to the motor driving unit 100.

That is, the power control unit 400 may restrict the current power by means of a PI control means by using allowable power information made by adopting the current rotational speed of the motor 10 analyzed by the analysis unit 300. The power control unit 400 may change the current power of the motor 10 by controlling the supply electric current of the motor 10.

For example, when the low-speed overload is generated by the sluggish condition, the allowable power information may be derived by applying the current rotational speed of the motor 10 to the driving limiting power information, and the current power of the motor 10 is restricted to be low by the control signal generated by using the allowable power information, such that the operating speed of the motor may be lower than a target speed. However, it is possible to prevent a problem of heat generation caused by the overload and prevent the burnout of the motor, the inverter, and the like.

Figure 2:
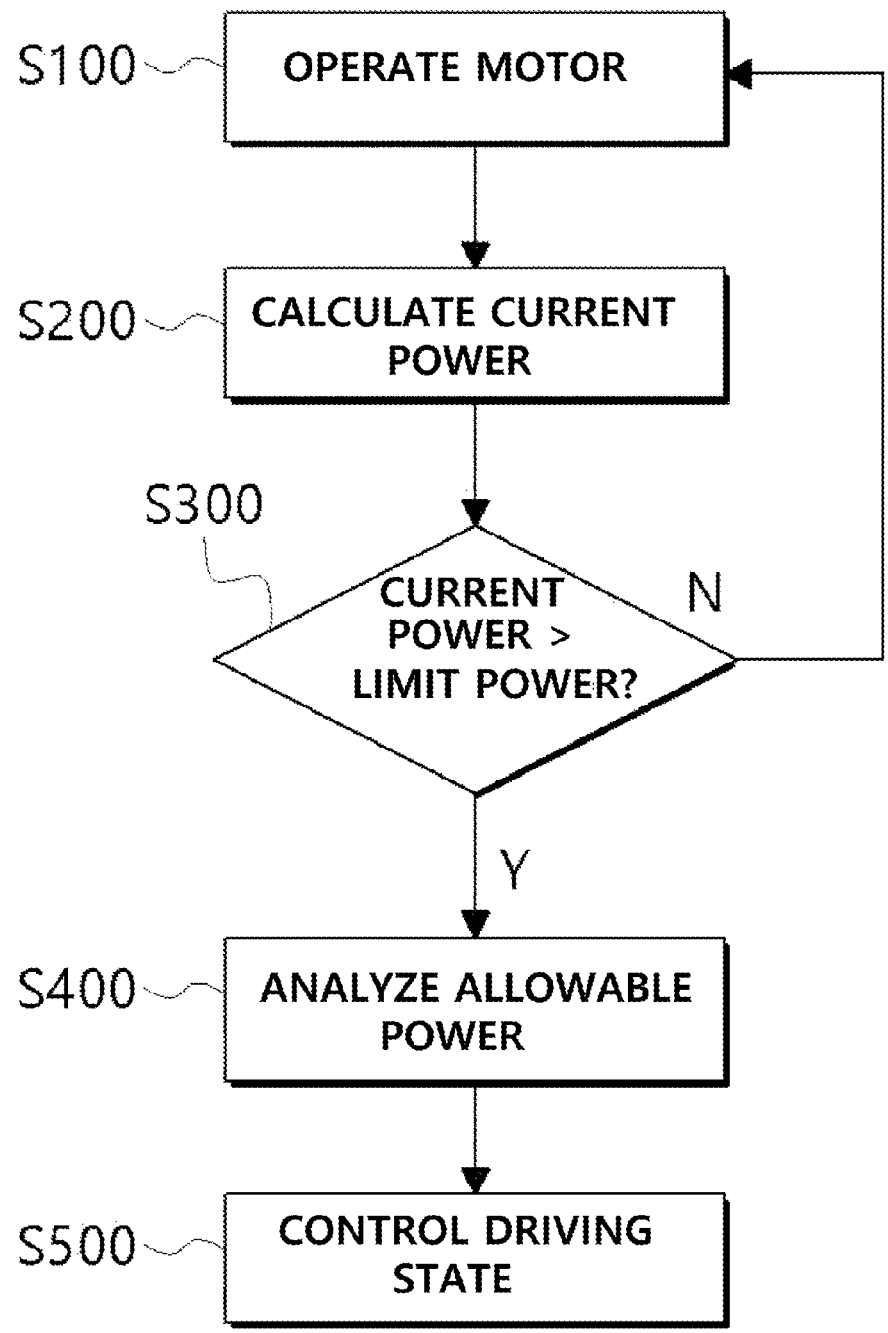
FIG. 2 is an exemplified view illustrating a sequence of a motor driving control method according to the embodiment of the present invention.

FIG. 2 is an exemplified view illustrating a sequence of the motor driving control method according to the embodiment of the present invention. The motor driving control method according to the embodiment of the present invention will be described in detail with reference to FIG. 2.

As illustrated in FIG. 2, the motor driving control method according to the embodiment of the present invention may include a driving step S100, a current power calculation step S200, a determination step S300, an analysis step S400, and a driving control step S500.

The respective steps will be described in detail. In the driving step S100, the motor driving unit 100 provides the drive electric current to the motor 10 in response to the driving signal inputted from the external manager or the high-level control means.

That is, the motor driving unit 100 receives the driving signal including the target rotational speed at which the motor 10 is intended to operate, and the motor driving unit 100 applies the electric current through the speed control means to allow the motor to reach the target rotational speed.

In the current power calculation step S200, the state calculation unit 200 acquires the operating state-related information of the motor 10 operated by the driving step S100 and calculates the current power information of the motor 10.

Specifically, in the current power calculation step S200, the state calculation unit 200 acquires pieces of information including the current rotational speed, the current measured electric current, and the current measured voltage of the currently operating motor 10 on the basis of the operating state-related information under the control of the motor driving unit 100, and the state calculation unit 200 calculates the current power information of the motor 10 by using the acquired current measured electric current and the acquired current measured voltage of the motor 10.

In the determination step S300, the analysis unit 300 may compare and determine the preset driving limiting power information and the current power information of the motor 10 calculated in the current power calculation step S200.

Specifically, in the determination step S300, on the basis of the basic specification information of the elements that constitute the motor 10, the driving limiting power information is set in advance on the basis of the rotational speed and the power, as illustrated in FIG. 3B, by analyzing the heat generating state according to the rotational speed and power of the motor 10.

Therefore, in the determination step S300, whether the current power of the motor 10 exceeds the limit power is determined by comparing and analyzing the limit power according to the driving limiting power information and the current calculated power of the motor 10 on the basis of the current rotational speed of the motor 10.

When the determination result in the determination step S300 indicates that the current power of the motor 10 exceeds the limit power, it may be determined that the current motor 10 is in the overload state.

Therefore, when the comparison and determination result in the determination step S300 indicates that the current power of the motor 10 exceeds the limit power, the allowable power information of the motor is analyzed on the basis of the driving limiting power information in the analysis step S400.

That is, the allowable power information corresponding to the current rotational speed of the motor 10 is analyzed on the basis of the driving limiting power information. The allowable power information is not appropriate power but corresponds to the upper limit value of the allowable power.

In the driving control step S500, the power control unit 400 generates the control signal for controlling the supply electric current of the motor 10 by using the allowable power information of the motor 10 analyzed by the analysis step S400, and the power control unit 400 transmits the control signal to the motor driving unit 100.

That is, in the driving control step S500, the power control unit may restrict the current power by means of the PI control means by using the allowable power information made by adopting the current rotational speed of the motor 10 analyzed by the analysis step S400, and the power control unit may change the current power of the motor 10 by controlling the supply electric current of the motor 10.

In this case, the motor driving control system and the control method thereof according to the embodiment of the present invention may prevent the occurrence of burnout of the motor, the inverter, and the like caused by the occurrence of the low-speed overload by the sluggish condition, but the motor may operate at a speed lower than the target speed according to the inputted driving signal. Therefore, at the time of generating the control signal on the basis of the allowable power information of the motor 10, the power control unit 400 may generate the overload condition of the current motor 10 by means of the external manager or the high-level control means while transmitting the control signal to the motor driving unit 100 and inform a user that a control signal, which enables the motor to operate at the target speed lower than the inputted driving signal, is additionally generated and transmitted.

Therefore, it is possible to prevent burnout of the motor and the inverter and detect the breakdown/abnormality.

The present invention is not limited to the above embodiments, and the scope of application is diverse. Of course, various modifications and implementations made by any person skilled in the art to which the present invention pertains without departing from the subject matter of the present invention claimed in the claims.

DESCRIPTION OF REFERENCE NUMERALS

10: Motor
100: Motor driving unit
200: State calculation unit
300: Analysis unit
400: Power control unit

What is claimed is:

1. A motor driving control system for detecting an overload condition of a motor even at low speeds, comprising:
a motor driving unit configured to provide a drive electric current to a motor 10 in response to an inputted driving signal;
a state calculation unit configured to calculate operating state-related information, including the current rotational speed, current measured current, and current measured voltage of the motor operated under the control of the motor driving unit, and to calculate the current power of the motor using the current measured current and current measured voltage;
an analysis unit configured to analyze allowable power information of the motor, including the current rotational speed and current power, by using the operating state-related information of the motor calculated by the state calculation unit on the basis of preset driving limiting power information; and
a power control unit configured to generate a control signal for controlling a supply electric current of the motor by using the allowable power information of the motor analyzed by the analysis unit and transmit the control signal to the motor driving unit,
wherein the driving limiting power information set based on a rotation speed and power of the motor by analyzing a heat generating state according to a rotational speed and power of the motor on the basis of basic specification information of the elements that constitute the motor, and
wherein the analysis unit is configured to compare the limiting power based on the driving limit power information, with the current power of the motor, using the current rotational speed of the motor as a reference, and dynamically adjust upper limit of allowable power of the motor.

2. The motor driving control system of claim 1, wherein the analysis unit compares and analyzes the current power and limit power according to the driving limiting power information on the basis of the current rotational speed of the motor calculated by the state calculation unit, and the analysis unit analyzes the allowable power information in accordance with the limit power when the current power exceeds the limit power.

3. The motor driving control system of claim 2, wherein the power control unit 400 changes the current power of the motor by controlling the supply electric current of the motor by using the allowable power information made by adopting the current rotational speed of the motor analyzed by the analysis unit 300.

4. A motor driving control method for detecting an overload condition of a motor even at low speeds, comprising:
a driving step of providing, by a motor driving unit, a drive electric current to a motor in response to an inputted driving signal;
a current power calculation step of calculating, by a state calculation unit, current power information by calculating operating state-related information, including the current rotational speed, current measured current, and current measured voltage of the motor operated in the driving step, and to calculate the current power of the motor using the current measured current and current measured voltage;

a determination step of comparing and determining, by an analysis unit, the limiting power based on preset driving limiting power information with the current power of the motor, using the current rotational speed of the motor as a reference, in the current power calculation step;

an analysis step of analyzing allowable power information of the motor, wherein the upper limit of allowable power of the motor is dynamically adjusted based on the driving limiting power information when the comparison and determination result in the determination step indicates that the current power information of the motor exceeds the driving limiting power information; and a driving control step of generating, by a power control unit, a control signal for controlling a supply electric current of the motor by using the allowable power information of the motor analyzed in the analysis step, wherein the driving limiting power information set based on a rotation speed and power of the motor by analyzing a heat generating state according to a rotational speed and power of the motor on the basis of basic specification information of the elements that constitute the motor, wherein the analysis step is configured to dynamically adjust the upper limit of the allowable power of the motor based on the comparison result of the limiting power based on the driving limiting power information, and the current power of the motor, using the current rotational speed of the motor as a reference.

5. The motor driving control method of claim 4, wherein the determination step comprises comparing and determining the driving limiting power information and the current power information of the motor on the basis of the current rotational speed of the motor.

* * * * *